Patented Aug. 11, 1931

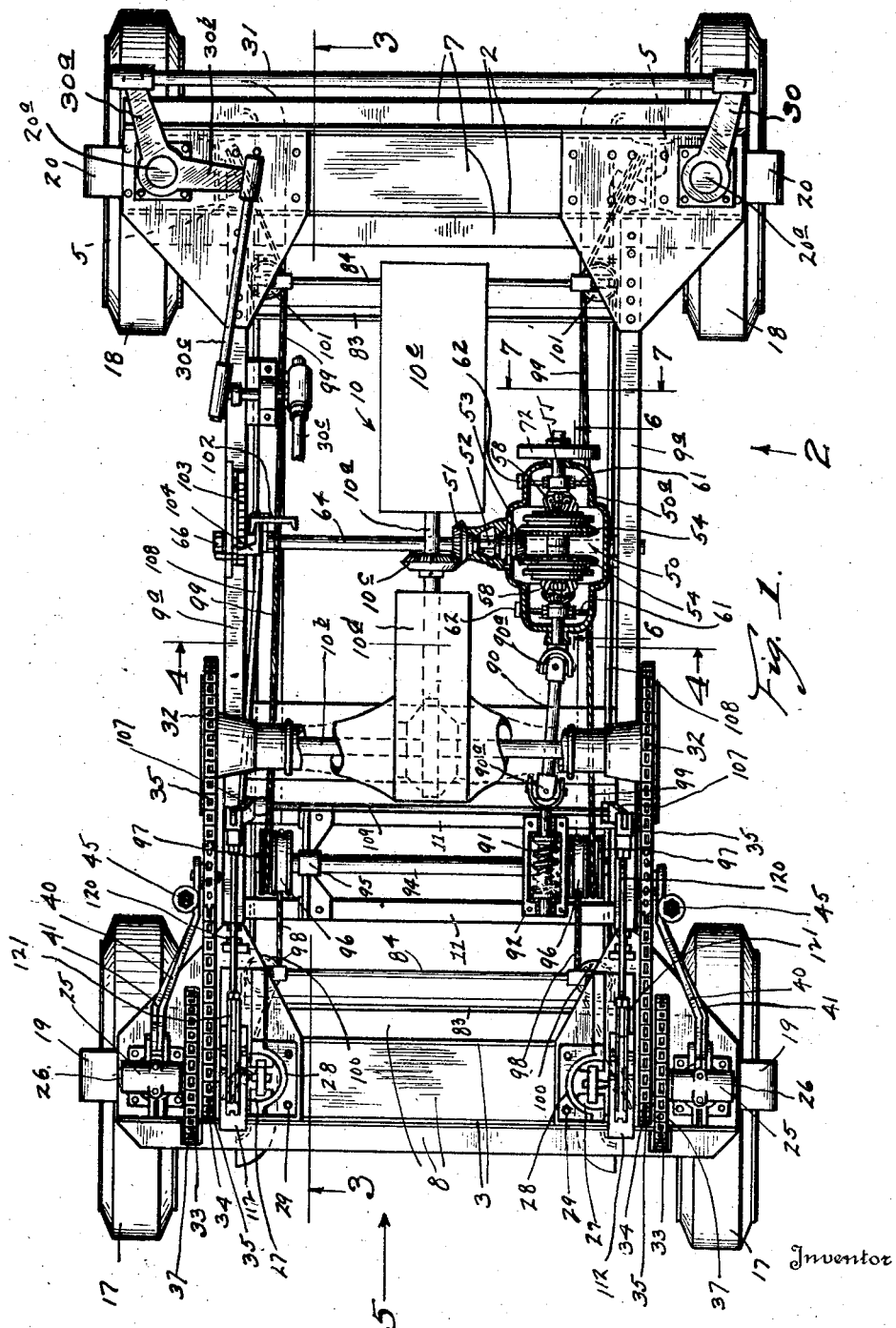

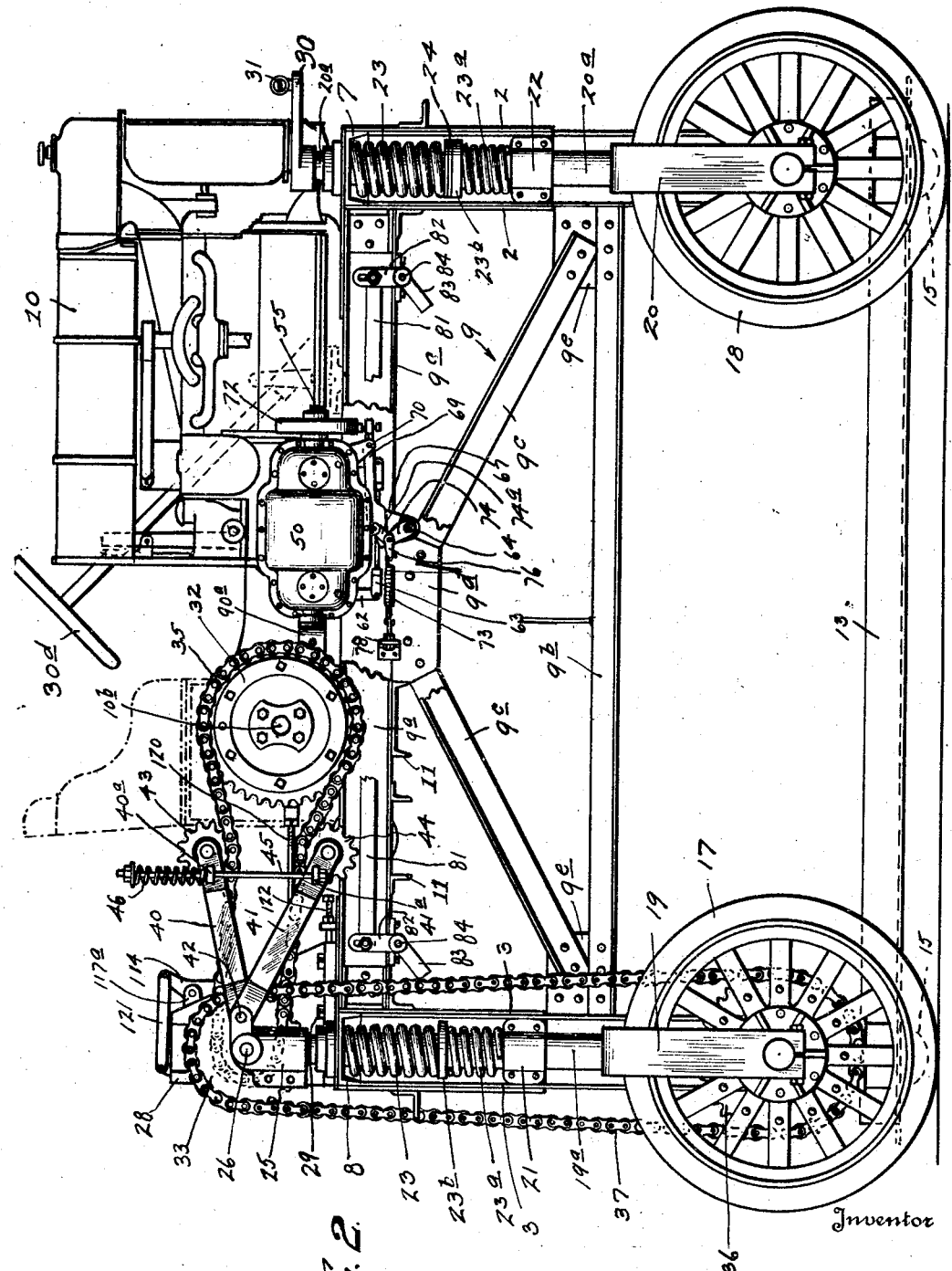

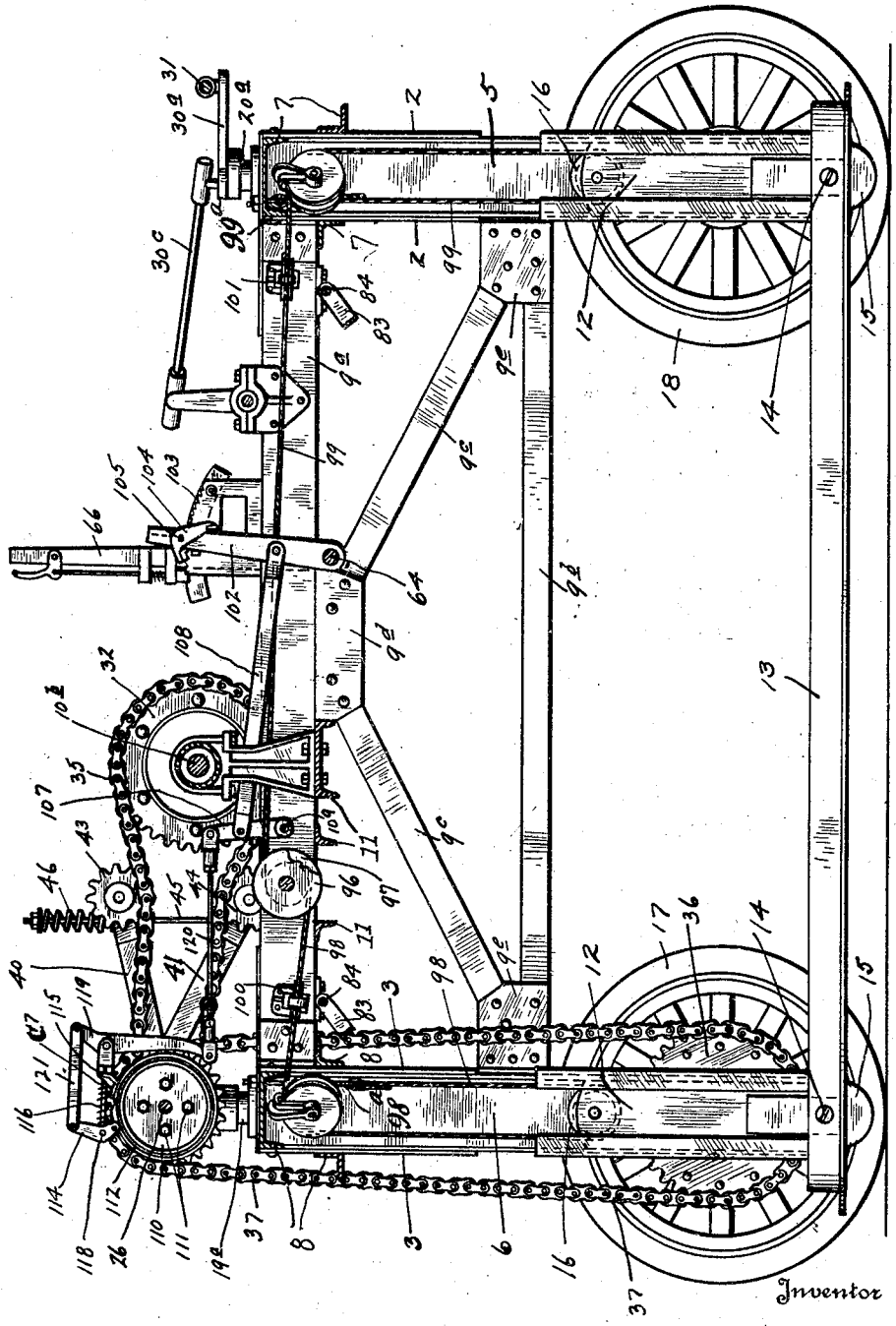

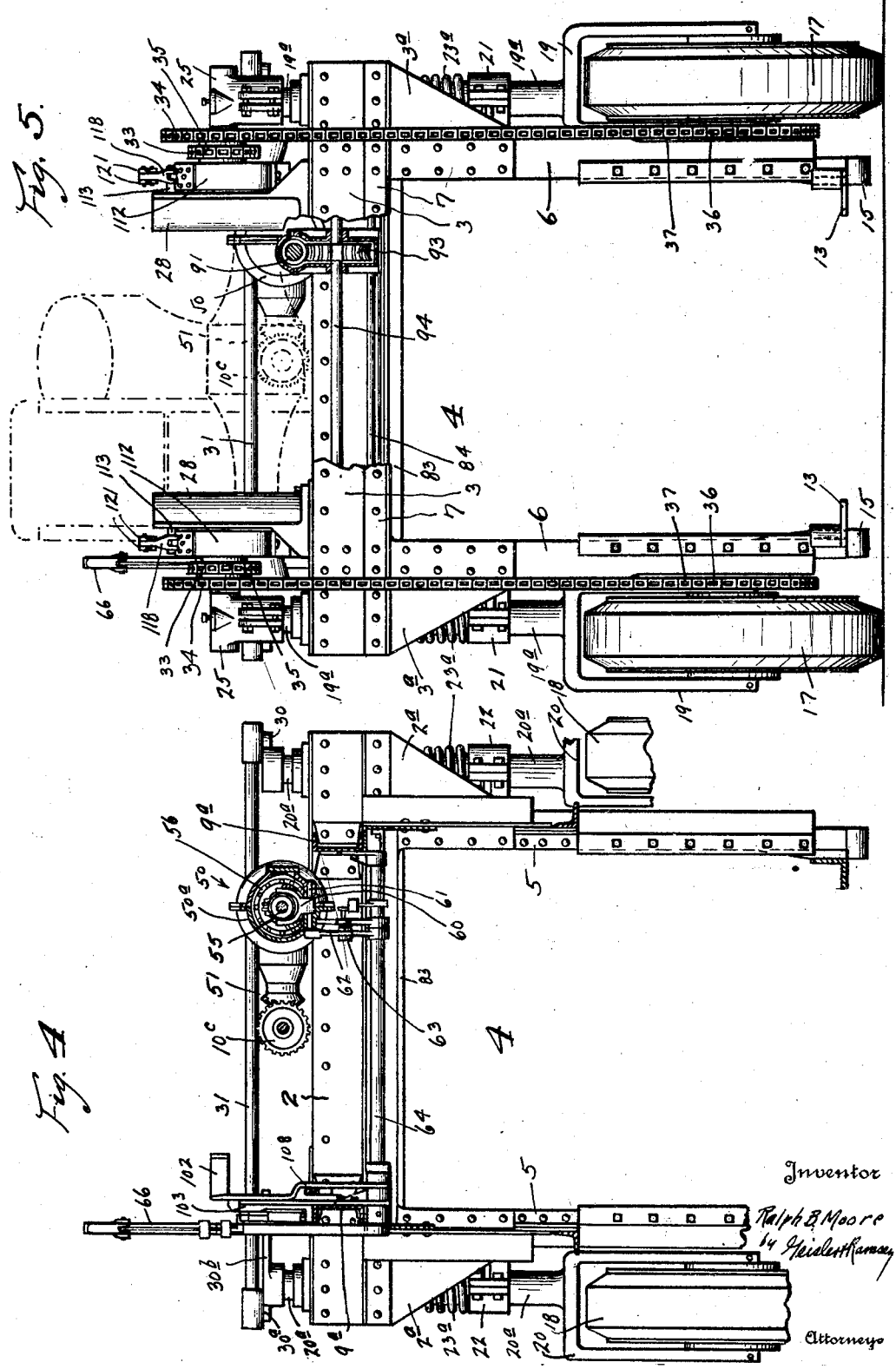

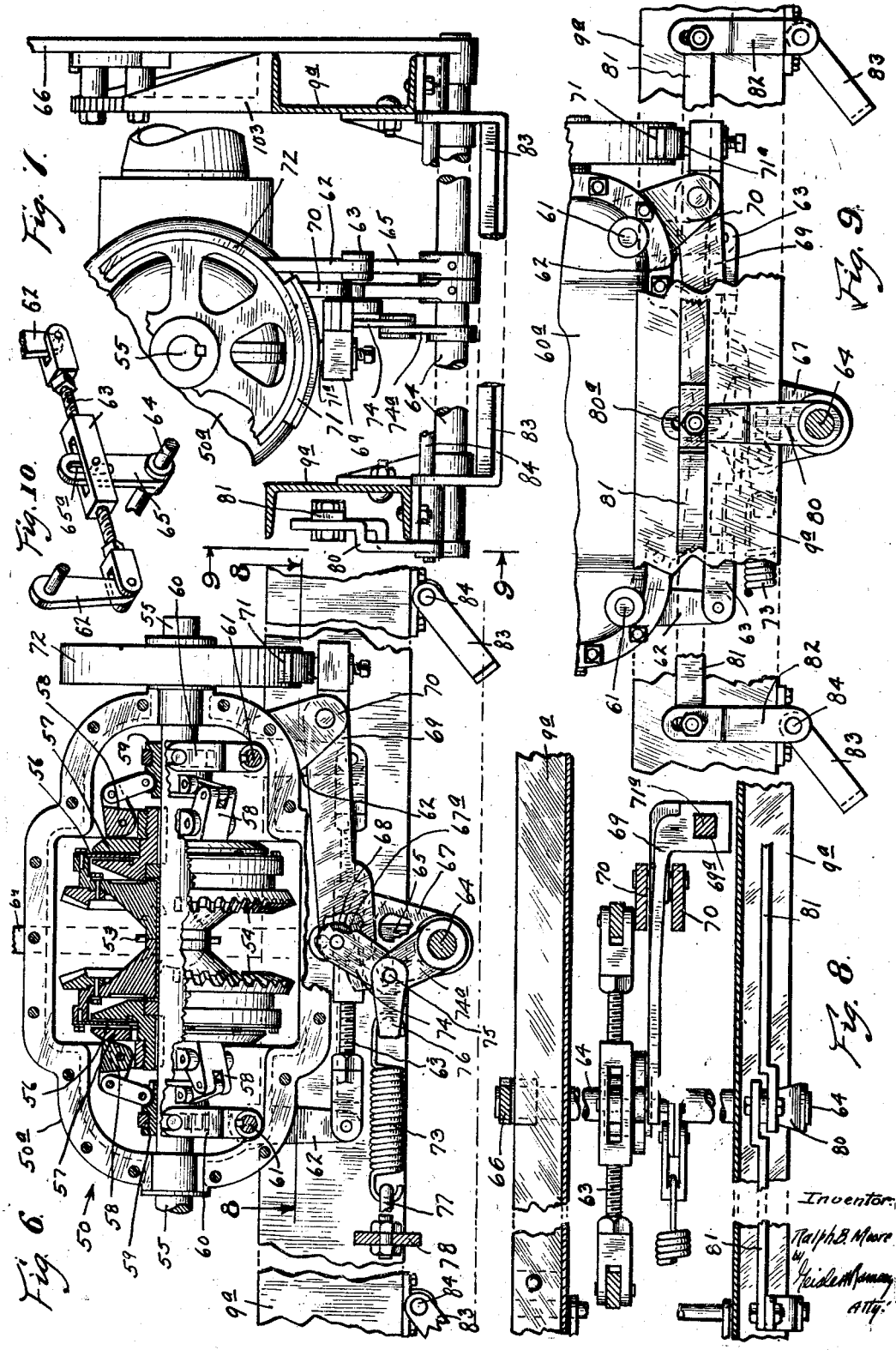

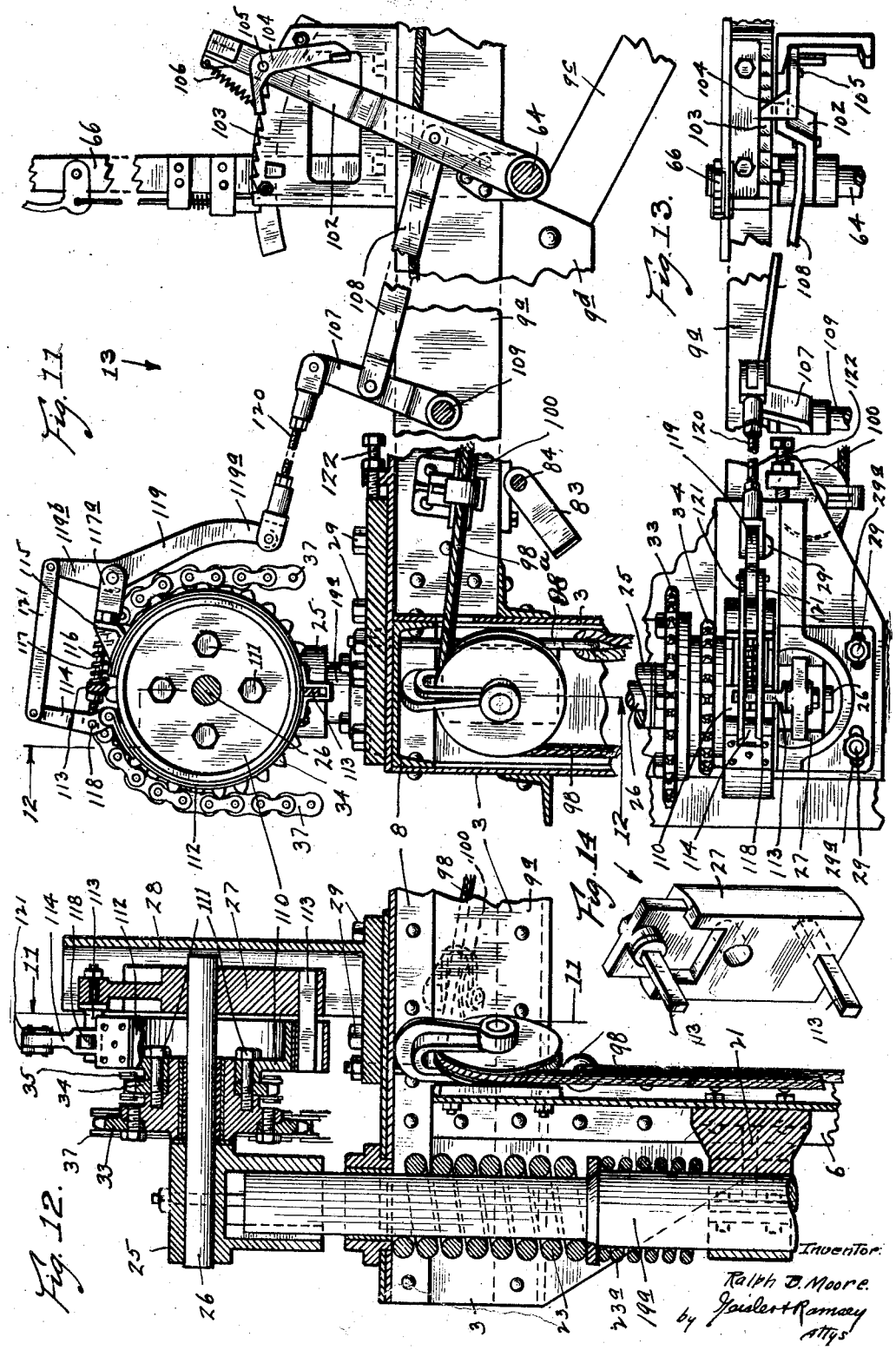

1,818,420

UNITED STATES PATENT OFFICE

RALPH B. MOORE, OF PORTLAND, OREGON

LUMBER CARRIER

Application filed December 7, 1925. Serial No. 73,858.

The principal objects of my invention are:

To provide a lumber carrier of this character which is particularly adapted to use a standard small tractor engine, using the main propelling shaft of said engine to drive the carrier, and using the standard power take-off shaft thereof to operate the hoisting mechanism for said carrier.

Also, to provide propelling means for the lumber carrier, which propelling means are adapted to accommodate the flexation of the frame, and also to accommodate the movement of the spring-mounted wheels, relatively to the frame. I attain the latter object by providing chains connecting the motor to the driving wheels, and preferably provide such chains with slack take-up devices, so that said chains are maintained in a relatively fixed state of tautness, independently of the relative positions of said wheels to said motor. Said slack take-up devices are also, preferably, arranged so that they will be unaffected by any change in direction in which said lumber carrier is driven; said devices being adapted automatically to transfer the slack from one side of the chain to the other, so as to eliminate the jerk which would otherwise result each time the direction of motion of said lumber carrier is reversed.

Also, to provide devices upon the rear, or driving wheels which permit said wheels to be easily and quickly alined with the steering wheels, when said steering wheels are arranged parallel to the frame sides. Wear of the connections for said driving wheels often tends to cause the latter to get out of parallelism with each other and with the front wheels, which causes the rubber tires thereon to be "scrubbed" along the ground and worn unduly. I attain this latter object by arranging said rear wheel mountings so that they can be pivoted in the frame, and provide means for locking said mountings in set position. In this manner I am able to release said setting means, to adjust said wheel mountings easily, and to quickly reset the same.

Also, to provide brakes for said lumber carrier, connected directly to the driving wheels so that said brakes will be substantially unaffected by the play in the power transmitting mechanism, as well as by the play in said connections themselves. I attain this object by mounting said brake mechanism in part upon the wheel mountings and in part upon the relatively stationary frame of the carrier. I arrange the latter slidably to engage each other, so as to permit relative movement of said frame and said mountings as previously described, and I connect said brakes to the wheel by means of a chain. In this manner the brake may be applied, and will be substantially unaffected by play in the operating parts, and yet be capable of accommodating relative movement between the wheel mountings and the frame.

Also, to provide automatic clutch and brake operating mechanism arranged to be actuated by the top of the load carried by said lumber carrier, said mechanism including a plurality of connected actuating devices arranged transversely of the carrier frame at each end of the load, so that the highest point of said load will engage one or both of said actuating members. Said actuating members thus are moved by the highest point of the load, irrespective of its position, to prevent said load from being moved so tightly against the undersurface of the frame as to injure the latter or the lifting mechanism.

Also, to provide load-engaging members extending along the entire length of the framed portions of the carrier, and to provide said engaging members with rounded feet adapted to space said engaging members from the ground to prevent the latter from catching any projections such as loose boards and the like, in the path of the carrier while it is being driven.

Also, to connect the load-carrying members of which said engaging members are a part to operating mechanism by relatively flexible cables, and pivotally to connect said engaging members to the latter so that if one end of one of said load-carrying members catches a projection, that end of said engaging member is free to swing upward to ride over said projection without racking or breaking any joints in said connections.

The details of my improved lumber carrier and the operation thereof, are hereinafter described with reference to the accompanying drawings, in which:

Fig. 1 is a plan view of the frame portion of my improved lumber carrier, with the motor therefor removed, its location however, being shown diagrammatically;

Fig. 2 is a side elevation of my improved lumber carrier taken in direction of the arrow 2 in Fig. 1;

Fig. 3 is a vertical section through my improved lumber carrier taken on the line 3—3 of Fig. 1;

Fig. 4 is a transverse vertical section taken on the line 4—4 of Fig. 1;

Fig. 5 is an end elevation taken in the direction of the arrow 5 in Fig. 1, with portions of the frame shown as broken away to disclose details of the hoisting mechanism;

Fig. 6 is an enlarged detailed view of the clutch mechanism taken on the line 6—6 of Fig. 1, portions of the mechanism being shown in section;

Fig. 7 is an enlarged section taken on the line 7—7 of Fig. 1 of said clutch mechanism and shows the automatic controls for said clutch and brake of the hoisting mechanism;

Fig. 8 is a foreshortened view taken on the line 8—8 of Fig. 6, disclosing details of the connections of the clutch and the brake;

Fig. 9 is a foreshortened elevation taken substantially on the line 9—9 of Fig. 7, except that portions have been broken away to disclose details of construction of the connections which would otherwise be concealed;

Fig. 10 is a fragmentary detailed view of the connections between the two halves of the clutch;

Fig. 11 is an enlarged sectional view taken substantially on the line 3—3 of Fig. 1, except that the devices are shown as foreshortened, portions being shown in section to disclose the details of the brake and brake-applying devices, said section also being taken on the line 11—11 in Fig. 12;

Fig. 12 is a similar scaled view taken on the line 12—12 of Fig. 11;

Fig. 13 is a fragmentary fore-shortened plan view taken in the direction of the arrow 13 in Fig. 11; and Fig. 14 is a perspective view of the alining shoe 27 for adjusting the angle of the rear wheels.

*Frame.*—The frame of my improved lumber carrier comprises two transversely arranged sets of plates 2 and 3 which extend across the front and rear ends of my carrier, respectively. Said plates are substantially U-shaped, and arranged two in a set spaced apart and tied together by structural members, as shown in Figs. 4 and 5. The pendent portions 2a and 3a of the plates 2 and 3, respectively, extend downwardly and straddle the interior aperture 4 in which the load is carried. To said pendent leg portions 2a and 3a are connected pendent sections 5 and 6, respectively, which are preferably arranged with flanges projecting outwardly. Said plates 2 and 3 being integral, form a rigid tie across the top of the carrier, which arrangement tends to prevent said I-beam sections 5 and 6 from spreading apart. Said plate members 2 and 3 are further strengthened and trussed by structural sections 7 and 8, respectively. Extending longitudinally of said carrier are the side frames 9 which are composed of an upper channel section, 9a, which form the direct support for the motor 10, and a lower angle section 9b which connects the leg portions 5 and 6 at approximately their middles. Said longitudinal side frame members 9a and 9b are connected by angularly arranged trussing sections 9c connecting a central pendent plate 9d with corner plates 9e. Transverse channel and angle sections 11 connect the two side-frames, and serve as a base for the rear portion of the motor, as shown in Fig. 3, and as supports for the hoisting drums, hereinafter described.

By making the frame entirely out of unbent structural sections the weight of the frame is materially decreased while its cost and strength remain approximately the same. By structural sections I refer to I-beams, channels, angles, T-bars and the like, and by combining with such sections the plates 2 and 3, I am able to eliminate substantially all castings. Said plates extend across the side frame portions and are carried directly by the wheel mountings so that the entire load is carried by said members. By spacing said plates apart by the sections as referred to, a box-like structure is provided which is adapted to utilize the full strength of said plates.

Slidably carried by the members forming the leg portions 5 and 6 are slides 12 which constitute a part of the load-hoisting mechanism. Said slides engage the inner face of said I-beams and carry the load-engaging flanges 13 upon pivotal connections 14. Said load-engaging flanges 13 are provided with rounded feet 15 at each end which serve to hold said flanges spaced from the ground. Said slides 12 each carry a sheave 16 at their upper ends, about which the load-lifting cables 98 and 99 are passed. Said cables, being relatively flexible, serve to support the load but do not comprise stiff compression members which would prevent said guides from being lifted upon said leg portions 5 and 6. Thus, if the lumber carrier is being driven and one of said rounded feet strikes a projection at that end, the load-engaging flange is permitted to rise and pass over said projection. The pivotal connections 14 permit said guides to be forced upwardly upon the pendent leg, said cable lifting device merely buckling.

*Wheel mounting.*—The rear wheels 17 and the front wheels 18 are carried by bifurcated forks 19 and 20, respectively, which are provided with rounded shanks 19a and 20a, respectively, which are journalled in boxings 21 and 22 carried by the pendent leg portions 5 and 6, respectively, inside of the outwardly arranged flanges, as shown in Fig. 2.

Springs 23—23a are load carrying and recoil springs, respectively. The load carrying springs 23 are relatively stiff and the recoil spring 23a relatively flexible and thus the load is adapted to compress said springs 23 and to permit the recoil springs 23a to elongate. A thrust-bearing 24 preferably is provided to permit the forks 20 to pivot readily without interference from the load carrying springs 23.

The upper ends of the shanks 19a and 20a are journalled so as to permit relatively free rotation in said frame. The forks 19 for the rear wheels 17 are each provided with a cap-like end 25 which is keyed to the shank. Said cap-like ends each carry a transversely arranged shaft 26 which in turn carries a circularly arranged shoe 27 which bears in a correspondingly curved guide 28 adjustably carried by the frame, being held by bolts 29. Said bolts pass through slotted holes 29a to permit the position of said vertically arranged guide 28 to be varied so as to change the alinement of the rear wheels relatively to each other and relatively to the front wheels.

The guide 28 which engages the shoe 27 is adjustable longitudinally of the frame by the adjusting screw 122, as shown in Fig. 11, the bolts 29 in their slotted holes 29a, permitting such adjustment. The guiding surface of said guide is curved upon a radius having its center coincident with that of the shank 19a, and the guide shoe 27 bearing in said curved surface of the guide 28, is similarly curved. Thus the changing of the position of said guide 28 upon said curved surfaces will cause said shank, and thus the wheel carried thereby, to be rotated to assume a different angle relatively to the sides of the frame.

The shanks 20a of the forks 20 for the front wheels 18, carry steering arms 30 and 30a which are connected by a rod 31. Said steering arms 30 and 30a are arranged angularly relatively to each other and upon lines which would intersect at a point directly through a vertical line extending through the axis for the rear wheels and centrally between said wheels. Said steering arm 30a is provided with a second arm 30b preferably integral thereto, which arm 30b is connected to the steering rod 30c which is shown as foreshortened in Fig. 1, but which is provided with a steering wheel 30d, as shown in Fig. 2.

As shown clearly in Figs. 4 and 5, the bifurcated end of the forks are offset relatively to the shank portions to produce a caster-like effect for the steering wheels. That is, the axis of rotation of said forks does not extend diametrically through the wheels carried thereby, and thus said wheels describe an arc when being turned by the steering mechanism. This not only causes said wheels to be turned more easily, but also eliminates the "scrubbing" action upon the tires, which action wears said tires unduly and is caused by turning said wheels about a fixed point.

My improved lumber carrier is particularly adapted to use a small tractor engine which is shown in Fig. 2 and indicated by the reference character 10, and thus the portions of said small tractor engine are not shown in detail. Thus in the steering mechanism the arm 30b is connected to the steering rod 30c in the usual manner and the details thereof are not shown.

*Driving mechanism.*—The standard propelling shaft 10a for said motor is used, as well as the rear axle 10b. The wheels which are ordinarily provided upon said small tractor are removed and sprockets 32 are mounted thereon. Each of the shafts 26 carries sprockets 33 and 34, the latter sprockets each being connected to a sprocket 32 by a chain 35 at each side, as shown in Fig. 1. Said sprockets 33 and 34 are preferably separate but bolted together so as to act as integral sections, the structure being shown in Fig. 12.

A driving sprocket 36 is carried by each rear wheel 17 and a chain 37 connects each of said sprockets with one of said sprockets 33. Inasmuch as the distance beween the sprockets 36 and 33 does not vary, because both are carried by the fork 19, the chain may be made with little or no slack and thus there is little play between said parts. Between the sprockets 34 and 32 however, there is considerable play because the sprocket 32 is carried by the frame and the sprocket 34 is carried by one of the relatively movable forks 19. Although the spacing between the sprockets is rather great for the angular movement between the same there is a substantial variance introduced in the spacing between said sprockets due to said angular movement and thus said chains have to be rather slack. The slackness in said chains not only causes a relatively great amount of play between said parts but also tends to permit said chains 35 to run off of either of said sprockets. The biggest disadvantage of said slack however, is that when the carrier changes direction the slack being taken up suddenly causes a jerk which produces displacement of the connections, due to the shock thereof.

I have discovered that this shock can be materially diminished if not entirely eliminated by providing a chain tightener of the type shown most clearly in Fig. 2. Said chain tightener comprises a pair of pivotally connected arms 40 and 41 connected at one end by a bolt 42 and provided at the opposite ends with idling sprockets 43 and 44, respectively. The ends of said arms which carry the sprockets are connected by a bolt 45 passing through ears 40a and 41a, respectively. Said rod is provided with a coiled compression spring 46 which tends to move said arms so as to decrease the angular relationship between the same, thus to maintain said chain in a predetermined condition of tautness. The resiliency of said spring 46 tends to permit the over-all elongation of said chain but when the direction of the lumber carrier is changed and the slack on one side of said chain is suddenly transferred to the opposite side, said action merely tends to pivot said arms 40 and 41 about their pivotal connection 42 and the shock attendant thereto is substantially unnoticeable, while if said slack-tightener is removed, the shock is so great that it frequently pulls the parts loose from their fastenings.

*Load-lifting mechanism.*—The load-lifting mechanism is actuated by the power take-off gear 10c fixed to the propelling shaft 10a of the motor, which gear is standard equipment on a small tractor motor and is located between the transmission 10d and the power plant 10e. The standard power take-off pulley and shaft are removed and a power take-off assembly including a clutch 50 substituted therefor; said clutch being provided with a driving pinion 51 which meshes with the gear 10c. Said pinion 51 is carried by the shaft 52 which also carries the bevel pinion 53, said shaft being journaled in the housing 50a of said clutch. Said bevel pinion 53 engages two freely rotatable clutch gears 54 at each side, said clutch gears being freely rotatable upon the shaft 55 which extends longitudinally through the clutch; said shaft being journaled in the clutch housing 50a as shown in Fig. 6. Each of said gears 54 carry one-half of the clutch which half comprises a relatively thin annular disk 56. The other half 57 of said clutch is keyed to the shaft 55 and comprises two jaw members spaced from each other.

Each of said clutch halves comprises two jaw-like members and a plate-like member 56 engaged thereby, said jaws being opened and closed by toggle joints 58 carried by a longitudinally slidable collar 59 slidable upon the shaft 55. There are two of these collars, one at each side of the clutch and each is moved by pivoted forks 60 which are keyed to transverse shafts 61. Said transverse shafts are rotatably mounted and are controlled by arms 62 connected by an adjustable rod 63, the details of said rod and arms being shown in Fig. 10. Thus, when said rod 63 is shifted in one direction the arms 62 are adjusted angularly to open the jaws upon one of said members and to close them on the other to grip the annular disk normally carried loosely in said jaws and to thus engage the gear 54 to be driven. When said rod 63 is shifted in the opposite direction, the other gear 54 is engaged and the mechanism is reversely operated. In intermediate position neither of said annular disks is engaged and the hoisting mechanism remains at rest.

A transversely arranged shaft 64 extends entirely across the upper portion of the frame and is keyed to the operating arm 65, the slotted upper end 65a of which engages the reciprocal adjustable rod 63 which positions the clutch halves in the manner previously described. Said transverse shaft 64 is rocked by the hand lever 66.

Said transverse shaft 64 also carries a cam-faced brake-operating member 67, which member is provided with a groove 67a, in its cam face adapted to receive the roller 68 carried by the brake-operating lever 69. Said brake-operating lever is pivotally carried by two spaced lugs 70 which are integral portions of the clutch housing. At the end of said lever 69 opposite the one which carries the roller 68, a brake shoe 71 is carried. Said brake shoe is provided with a square end 71a which is adapted to fit snugly within the squared aperture 69a in said brake-operating lever. Said shoe 71 is adapted to engage the periphery of the brake disk 72 keyed to the shaft 55.

Said roller 68 is held tightly in its groove 67a by the spring 73 which acts through two pivoted links 74 and 74a. Said links 74 and 74a are connected together and to a pin 75. The free end of said link 74a is rotatably carried by the shaft 64 and the free end of the link 74 carries the roller 68 and thus when the spring pulls upon the shackle 76 which connects said spring 73 to said links the roller is seated tightly in the notch formed upon said cam face. The other end of said spring 73, opposite to the one connected to said shackle 76, is connected to an eye bolt 77 carried by a lug 78 which forms a part of the frame and thus is relatively fixed. The groove 67a for the roller 68 is arranged so that the brake is applied only when the clutch is arranged in neutral position and thus when the clutch is arranged in lifting or lowering position the faces of said cam lift the roller and thus the brake shoe out of engagement with the brake disk 72 and thus permits said shaft 55 to rotate freely.

*Automatic control devices.*—An arm 80 is fixed to the shaft 64 and at its free end is connected to a reciprocal link 81 through a slotted connection 80a. Said reciprocal link is connected at each end to arms 82 which in turn are connected to U-shaped control members 83 which hang pendently beneath the lower edge of the frame members 9a, as shown in Fig. 2. Said control members 83 are spaced so as to extend across the frame of the lumber carrier at each end and thus if one end of the load carried by the carrier extends up higher than any other portion, the highest portion of said load will engage one of said control members. The engagement of one of said members will tend to rock the same about its pivot 84 and will rock the arm 82 connected to said member angularly and will cause its free end to reciprocate the link 81 until it assumes the position shown in Fig. 9. In this position the transverse shaft 64 has been rocked so that the clutch is thrown into neutral position and the brake applied by permitting the roller 68 to fall into its groove on the face of the cam 67. This permits the spring 73 to move the shoe 71 into engagement with the periphery of the brake disk 72. Connected to one end of the shaft 55 is a short section of shaft 90, which drives the worm 91 to operate the lifting drums. Said shaft 90 is connected through universal joints 90a at each end so as to prevent the shafts from becoming racked or bound by the twisting of the frame under a load.

Said worm 91 is carried within the housing 92, said housing being supported by the transverse angle sections 11. Also carried within said housing 92 and meshing with said worm 91 is a worm gear 93 fixed to the transverse shaft 94 which is journaled in said housing 92 and in boxing 95 also carried by said angle members 11. Fastened to said shaft 94 are two sets of drums 96 and 97 at each end of the shaft, the drums 96 having cables 98 passing over the same and connected to the sheave 16 carried upon the rear wheels. Cables 99 pass over the drums 97 and engage the sheaves 16 carried by the front wheels. Guiding sheaves 100 are arranged to guide the cables 98, and guide sheaves 101 guide the cables 99.

The free end of each of the cables 98 is fastened to the frame through a threaded eye-bolt 99a and takes a half turn about the sheaves 16, passes around said guiding sheaves 100 and is fastened to the drum 96. The cables for the front end of said load-engaging devices are similarly arranged, the ends thereof being fastened to the frame through threaded eye-bolts 98a, passed around the sheave 16 and around the guide sheaves 101 and being fastened to the operating drum 97. The eye bolts 98a and 99a being threaded permit any slack present in the cables 98 and 99 to be taken up, quickly and conveniently.

*Brake-applying devices.*—The details of the brake-applying devices are shown most clearly in Figs. 11 to 13, inclusive. The brake is applied through a foot lever 102 which is journaled about the shaft 64. A toothed quadrant 103 is arranged to be engaged by a pawl 104 carried by said foot lever. Said pawl is arranged to be set by rocking the pawl about its pivot 105, said pawl normally being held out of engagement by a spring 106.

The foot lever 102 is connected to the brake-applying lever 107 by a link 108 pivotally connected to both levers. Said operating lever 107 is pivotally mounted upon a trunnion 109 carried by the frame.

The brake drum 110 preferably is integral with or fastened to the sprocket 34 by bolts 111, as shown in Fig. 12. Said brake drum thus is fastened directly to the sprockets 33 and 34 which in turn are engaged by the chain 37 which drives the rear wheels. Said brakes thus act directly upon the wheels instead of acting through the engine, its differential or any of the driven devices.

An exterior contracting band 112 is mounted over said brake drum and is carried by two squared pins 113 which in turn are carried by the shoe 27. The contracting mechanism for said brake band comprises a lever 114 and a lug 115 which normally are held spaced apart by a spring 116. A rod 117 is pivotally connected to the lever 114 at its pivot point 118. Said rod slides through the lug 115 and the bifurcated end 117a of said rod is fastened to a bell-crank 119. One end 119a of said bell-crank is connected to the operating lever 107 through an adjustable turnbuckle 120 and its other end 119b is connected to the lug 114 through a link 121. When the foot lever 102 is moved clockwise or away from the operator it correspondingly rocks said operating lever 107 clockwise, pulls the turn-buckle 120 and rocks the bell-crank 119 counterclockwise and pushes the link 121, rocks the lever 114 counterclockwise and forces that end connected to the band, towards the lug 115, thus compressing the spring 116. When the foot lever is released the spring 116 tends to space the lever 114 and lug 115 apart and to return said operating devices to their normal positions. It can thus be seen that the brakes not only act directly upon the wheels but are also adjustable relatively therewith.

I do claim:

1. In a carrier, a frame adapted to straddle a load, means for engaging and lifting said load, the latter comprising shoes extending substantially the entire length of said frame, and vertical slides pivotally connected thereto, said lifting means also including a yieldable element connected to said slides, whereby either end of said lifting shoes may be lifted without injuring the load lifting mechanism.

2. In a carrier, a frame adapted to straddle a load, means for engaging and lifting said load, the latter comprising shoes extending substantially the entire length of said frame, and vertical slides pivotally connected thereto, said lifting means also including a cable element connected to said slides, whereby either end of said lifting shoes may be lifted without injuring the load lifting mechanism.

3. In a carrier, a frame adapted to straddle a load, means for engaging and lifting said load, the latter comprising shoes extending substantially the entire length of said frame, and feet, arranged on the under side of said shoes to space the latter from the ground, for the purpose described.

4. In a carrier, a frame adapted to straddle a load, means for engaging and lifting said load, the latter comprising shoes extending substantially the entire length of said frame, and rounded feet, arranged on the under side of said shoes to space the latter from the ground, for the purpose described.

5. In a carrier, load-lifting mechanism including a clutch in the operating mechanism therefor, and a plurality of transversely arranged, horizontally pivoted, pendent clutch-actuating members, one of said members being arranged at each end of and underneath the body of the carrier, and adapted to be engaged by the top of the load lifted thereby.

6. In a carrier, a frame, load-lifting means mounted thereon, means for transmitting motion from a source of power to the load-lifting means including a shaft, a clutch element and a brake element carried by such shaft, operating devices for such clutch and such brake elements arranged simultaneously to disengage such clutch and set such brake elements and automatic means positioned to be engaged by the load, such latter means being operatively connected to and adapted to actuate such clutch and brake operating devices.

7. In a carrier, a frame, a hoist, wheel mountings supporting said frame, a cable element operatively connected to said hoist, the ends of said cable being formed into two loops, two fittings carried by said frame by which the ends of said cable loops are secured to said frame, and load engaging devices operatively mounted in the bights of said loops, said fittings being adjustable longitudinally of the cable ends thereby to provide a slack take-up device for the latter.

RALPH B. MOORE.